United States Patent [19]

Usami et al.

[11] 3,923,540

[45] *Dec. 2, 1975

[54] METHOD FOR TREATMENT OF METALLIC SURFACE

[75] Inventors: Shoji Usami, Sayama; Haruo Kozu, Fujisawa, both of Japan

[73] Assignee: Kansai Paint Company, Ltd., Japan

[ * ] Notice: The portion of the term of this patent subsequent to Oct. 22, 1991, has been disclaimed.

[22] Filed: Feb. 19, 1974

[21] Appl. No.: 443,487

[30] Foreign Application Priority Data

Mar. 1, 1973 Japan............................ 48-23749

[52] U.S. Cl. ............................ 134/2; 134/30; 195/2
[51] Int. Cl.² ........................................... C23G 1/00
[58] Field of Search ............. 195/1, 2; 134/2, 3, 41, 134/42, 30; 148/1; 252/80

[56] References Cited
UNITED STATES PATENTS 2,395,694  2/1946  Spence et al. ......................... 134/2

OTHER PUBLICATIONS

Sutton et al., "Leaching Copper Sulfide Minerals with Selected Autotrophic Bacteria", Cited in Chemical Abstracts 61:1543e.

Kurihara et al., "Microbial Leaching of Sulfide Ores", Cited in Chemical Abstracts 74:137034m.

*Primary Examiner*—A. Louis Monacell
*Assistant Examiner*—R. B. Penland
*Attorney, Agent, or Firm*—Ostrolenk, Faber, Gerb & Soffen

[57] ABSTRACT

A method for treatment of metallic surface which is characterized in that the metallic surface to be treated is caused to contact a cultured suspension of microorganism such as ferrobacillus ferrooxidans or ferrobacillus sulfooxidans in an aerobic culture condition at a temperature of 20° to 45°C., preferably 25° to 35°C. The treatment of metallic surface can be carried out with ease, safety and economy without causing any problems of waste treatment and environmental pollution.

8 Claims, No Drawings

METHOD FOR TREATMENT OF METALLIC SURFACE

BACKGROUND OF THE INVENTION

This invention relates to a method for treatment of metallic surfaces using micro-organisms. More particularly, the invention relates to said treatment method utilizing microorganisms which belong to the genus of ferrobacillus.

In the conventional art, the rust, scales or spots formed on metallic surfaces have been generally removed by chemical methods using mainly acid or alkaline treating solutions and mechanical methods using abrasives. However, in the former methods, the treating solutions must be supplemented during the treating process as the solutions are liable to lose their chemical activities slowly, and the waste solutions of the treatment must be made innocuous by, for example, neutralization so as not to cause environmental pollution. The operations and the apparatus for such waste treatment are relatively large-scale and complicated which cause the economical disadvantages from the commercial view point. Further, these treatment solutions induce inflamation of skin of the operators so that it is difficult to expect the perfectly safe work of such treatment. In the mechanical treatments, the smoothing work using the abrasive takes very much time and labor, especially the treatment of articles having complicated configurations, is very difficult.

BRIEF SUMMARY OF THE INVENTION

Accordingly, the principal object of the present invention is to eliminate the above-mentioned disadvantages. A further object of the invention is to propose a novel method for treatment of metallic surfaces which are formed with rust or scales, or adhered with stains or spots, through a safe, rational and economical manner. As the result of several extensive studies, the inventors have found a novel method for carrying out the above objects which is characterized in that the method may be performed through the action of micro-organisms belonging to the genus of ferrobacillus.

DETAILED DESCRIPTION OF THE INVENTION

The micro-organisms employed in the method of the invention are, so to speak, chemoautotrophic bacteria which utilize carbon dioxide as the carbon source and inorganic nitrogen compounds as the nitrogen sources and take the energy necessary for the assimilation of them from the oxidation energy of oxidizable inorganic materials.

More particularly, the micro-organisms used in the method of the invention belong to a genus of ferrobacillus which utilizes the energy generated by the oxidation of sulfur and/or iron as the assimilation energy. As such micro-organisms, there are, for example, ferrobacillus ferrooxidans No. 13,661 (Deposition number of ATCC - American Type Culture Collection) and ferrobacillus sulfooxidans No. 14,119 (Deposition number of ATCC), the mycological characteristics of which are shown in the following Table 1.

Table 1

| Characteristics | Name of Micro-organism | Ferrobacillus ferrooxidans ATCC Deposition No. 13,661 | Ferrobacillus sulfooxidans ATCC Deposition No. 14,119 |
| --- | --- | --- | --- |
| Form | | Short rods | Short rods |
| Size (microns) | | 0.6–1.0 × 1.0–1.6 | 0.5 × 1.0–1.5 |
| Motility | | + | + |
| Flagellum | | Monotrichous | Monotrichous |
| Gram Stein | | – | – |
| Optimum Growth Temp. | | 25 – 35°C | 25 – 35°C |
| Optimum Growth pH | | 2.5 – 5.0 | 2.0 – 5.0 |
| Oxygen Demand | | + | + |
| Carbon Source (Carbon dioxide demand) | | + | + |
| Nitrogen Source (Ammonia-type nitrogen) | | + | + |
| (Nitrate-type nitrogen) | | – | + |
| Energy Source | | | |
| Liquid Medium | (Ferrous) | + | + |
| " | (Sulfur) | – | + |
| " | (Sodium thiosulfate) | – | + |
| Agar Medium | (Ferrous) | + | + |
| | (Sodium thiosulfate) | – | + |
| Silica Gel Medium | (Ferrous) | + | + |

For the growth of the micro-organisms in the present invention, the culture medium containing ferrous salts, nitrogen sources such as ammonium sulfate, phosphoric salts such as potassium phosphate and magnesium salts such as magnesium sulfate may be used for the ferrobacillus ferrooxidans, where the oxidation energy of said ferrous salts is taken as the energy source, and the culture medium containing ferrous salts, sulfur or sulfur compounds, nitrogen sources, for example, ammonium sulfate and potassium nitrate, phosphoric salts such as potassium phosphate and magnesium salts such as magnesium sulfate may be used for the ferrobacillus sulfooxidans, where the oxidation energy of said ferrous salts and sulfur or sulfur compounds is taken as the energy source.

As for an aqueous suspension of the micro-organism for the treatment of the present invention, the aqueous suspension of a cultured medium containing dense cells, or the aqueous suspension in the course of culture through inoculation of said micro-organism may be used. The metallic articles to be treated are immersed into said suspension, or said suspension is sprayed on the surfaces of said articles, and they are kept as they are for a while. Thus the rust, scales and/or stains on the surfaces of metallic articles can be removed to obtain clean surfaces.

The micro-organisms of the present invention are aerobic, so that carbon dioxide and oxygen are necessary for the growth of the micro-organisms, and the treatment must be carried out in an aerobic condition by aeration, shaking or stirring. Further, the treatment should be carried out by keeping the micro-organisms from contamination of other stronger bacteria or other ill conditions.

Furthermore, the aqueous suspension of the micro-organisms has to be used at a temperature in the range of 20° to 45°C. When the temperature is lower than 20°C, the activity of the micro-organism is decreased to cause insufficient treatment, and when the temperature is higher than 45°C, the micro-organism becomes extinct.

There remain several unknown points of the micro-organisms used for the treatment of the present invention with regard to taxonomy, and the biochemical features and functions of the micro-organisms are intricate, so that some details are also left unknown. The mechanism in the metallic surface treatment of the invention by using the micro-organisms is, however, clear, that is the treatment owing to the direct action of the micro-organism and to the indirect action of the metabolic product thereof. That is to say, the ferrobacillus ferroxidans and ferrobacillus sulfooxidans are iron bacteria, and when these bacteria contact the iron surface, the oxidase of the bacteria consumes the activated portion of the metallic surface as the energy source, thereby the condition like the anode of an ionic concentration cell is formed to promote the consumption of the metal and as the result of the consumption of the metallic surface, the rust, scales and spots on the metallic surface are removed. Thereby, the metabolism of the micro-organism directly takes part in the treatment of the metallic surface of the present invention.

The above-mentioned ferrobacillus sulfooxidans consumes sulfur or sulfur compounds besides iron as the energy source. Therefore it can be applied to the surface of a metal containing sulfur, in which the mechanism of the function is almost the same as that of said ferrobacillus ferrooxidans. In addition to that, even if the metallic surface to be treated contains neither iron nor sulfur, when sulfur or sulfur compound is contained in the treating solution, sulfuric acid is formed as the oxidation product of the sulfur which peels off the rust, scales and spots on the metallic surface. Therefore, the indirect effect of the metabolic product of the micro-organism can be expected. Accordingly, the ferrobacillus ferrooxidans can be used for the surface treatments of iron and metals containing iron, and the ferrobacillus sulfooxidans can be used for the surface treatments of iron, metals containing iron and/or sulfur, and metals which being soluble in sulfuric acid such as aluminum, zinc, tin, manganese, nickel, chromium or metals containing these.

As disclosed in the above, the present invention relates to a method for the treatment of metallic surfaces which is characterized in that the treatment is carried out by utilizing the action of micro-organisms. As the result of this invention, several effects can be obtained which are advantageous as compared with the conventional treating methods. That is, a small amount of the micro-organism is sufficient for the surface treatment because the growth of the micro-organism proceeds during the reaction with the metal to be treated, and there is no necessity to supplement with additional micro-organism during the treatment step. The waste of the treatment contains no toxic material, and therefore it does not cause any environmental pollution. The waste of the treatment can be disposed simply by heating at a temperature of higher than 50°C as the micro-organism can be disinfected at such temperature to cease its action. Further, when sufficient mycological cares are taken, the treatment and its waste do not produce any ill effect for human health and safe operation can be expected. Still further, the method of the invention is carried out by using a liquid treating medium so that any surface of metallic article having a complicated configuration can be treated with ease. Accordingly, the process of the metallic surface treatment can be simplified, and also is improved in view of the safety and economy.

In order that the invention may be more fully understood, preferred examples and supplementary features will be described in the following.

EXAMPLE 1

A solution consisting of 3.0 g of $(NH_4)_2SO_4$, 0.5 g of $KH_2PO_4$, 0.5 g of $MgSO_4 \cdot 7H_2O$, 0.1 g of KCl, 0.01 g of $Ca(NO_3)_2$ 1 ml of $10NH_2SO_4$ and 1000 ml of water was prepared, and after sterilization, 140 g of $FeSO_4 \cdot 7H_2O$ was added to said solution to obtain a culture medium (pH: 2.6). This culture medium was inoculated with 20 ml of a rinsed suspension of the ferrobacillus ferrooxidans (ATCC Deposition No. 13,661), and a cotton stopper was applied to the container. Then the medium was cultured in an aerobic condition with shaking at 30°C for 72 hours to obtain a cultured suspension of 0.24 in cell concentration (transparency of 470 m$\mu$ light ray). To 500 ml of thus obtained suspension were added 3500 ml of water and 20 g of $FeSO_4 \cdot 7H_2O$, to prepare the metallic surface treatment solution of the present invention.

Thereafter, mild steel plates (size: 300 × 100 × 0.5 mm) which gathered rust by 30 days outdoor exposure were immersed into 3000 ml of the above treating solution at 35°C, and sterile air was passed to said solution through the cotton stopper, and thus the rust removabilities were tested. In the experiments, one rusted plate was immersed into the treating solution for one hour and then the plate was taken out from the solution to measure the rust removability. After that a certain number of plates (30 plates in total) were immersed into the treating solution each for one hour one by one to measure the change of the rust removability of the treating solution. In the meantime, the measurements of the rust removabilities of 2 hours and 4 hours immersions were carried out in like manner as the above. The results of the above tests are shown in the following Table 2.

COMPARATIVE EXAMPLE

Rusted mild steel plates (300 × 100 × 0.5 mm) as used in the foregoing Example 1 were immersed into 3000 ml of 5% by weight phosphoric acid aqueous solution at 20°C to measure the rust removability in like manner as the above Example 1, the results of which are also shown in the following Table 2.

Table 2

| Example | Example 1 ω/MO | | | Comparative Example ω/H₃PO₄ | | |
|---|---|---|---|---|---|---|
| Immersion (hours) | 1 | 2 | 4 | 1 | 2 | 4 |
| Plate Number of Treatments | | | | | | |
| 10 | 30 % | 90 % | 100 % | 70 % | 100 % | 100 % |
| 20 | 35 % | 100 % | 100 % | 60 % | 70 % | 60 % |
| 30 | 45 % | 100 % | 100 % | 40 % | 40 % | 20 % |

In the above Table 2, the percentages are rust removing ratios which indicate the ratios of the areas where the rust was removed. Thus the value 100 % means that the rust was removed completely.

As will be understood from the foregoing Table 2, in case of the conventionally used phosphoric acid solution, the rust removability decreases gradually as the plate number of treatments increases because the acidity of the treating solution is gradually reduced, and accordingly the treating solution must be supplemented periodically or continuously. On the other hand, in the treating solution of the present invention, the rust removabability thereof becomes larger with the increase of the treatment number owing to the bacterial growth, and therefore the replenishment of the treating solution is not necessary.

EXAMPLE 2

A solution consisting of 5.5 g of $KNO_3$, 0.5 g of $KH_2PO_4$, 0.5 g of $MgSO_4 . 7H_2O$, 0.1 g of KCl, 0.01 g of $Ca(NO_3)_2$, 1 ml of $10NH_2SO_4$ and 1000 ml of water was prepared, and after sterilization, 140 g of $FeSO_4 . 7H_2O$ was added to said solution to obtain a culture medium (pH: 2.6). This culture medium was inoculated with 20 ml of a rinsed suspension of the ferrobacillus sulfooxidans (ATCC Deposition No. 14,119), and a cotton stopper was applied to the container. Then the medium was cultured in an aerobic condition with shaking for 72 hours at 30°C, thereby the cultured suspension of 0.20 in cell concentration (transparency of 470 mµ light ray) was obtained. Then, 3500 ml of water and 20 g of $FeSO_4 . 7H_2O$ were added to 500 ml of thus obtained cultured suspension to produce the metallic surface treating solution of the invention. In the next step, a mild steel plate (300 × 100 × 0.5 mm) which was stained with soot and oil spots, was immersed into the above treating solution at 30°C, and was kept for 8 hours with a feed of sterile air through the cotton stopper. The above mild steel plate was taken out thereafter from the treating solution and rinsed with water, and it was found that the soot and oil spots all over the surface of the plate were removed completely to obtain a clean plate.

EXAMPLE 3

A solution containing 3.0 g of $(NH_4)_2SO_4$, 0.5 g of $KH_2PO_4$, 0.01 g of $Ca(NO_3)_2$, 0.5 g of $MgSO_4 . 7H_2O$, 10 g of sulfur powder, 0.1 g of KCl, 1 ml of $10NH_2SO_4$ and 1000 ml of water was prepared, and was sterilized to obtain a culture medium (ph: 2.6). Said culture medium was inoculated with 20 ml of a rinsed suspension of the ferrobacillus sulfooxidans (ATCC Deposition No. 14,119), then applied with a cotton stopper, and cultured in an aerobic condition with shaking for 48 hours at 30°C. Thus the cultured suspension of 0.21 in cell concentration (transparency of 470 mµ light ray) was obtained. Then, 3500 ml of water and 20 g of sulfur powder were added to 500 ml of thus obtained cultured suspension to produce the treating solution of the invention. Thereafter, a zinc plate (300 × 100 × 1 mm) which had been dipped in seawater for 30 days and adhered with rust, seaweeds and barnacles, was immersed into said treating solution for 4 hours at 25°C with the feed of sterile air through the cotton stopper. After this treatment, the zinc plate was taken out from the treating solution and rinsed with water. Said rust, seaweeds and barnacles were removed completely from the plate and a clean zinc plate could be obtained.

EXAMPLE 4

A solution containing 3.0 g of $(NH_4)_2SO_4$, 4.0 g of $KH_2PO_4$, 0.5 g of $MgSO_4 . 7H_2O$, 0.3 g of $CaCl_2 . 2H_2O$, 1 ml of $10NH_2SO_4$, 10 g of sulfur powder and 1000 ml of water was prepared, and after sterilization, 100 g of $FeSO_4 . 7H_2O$ was added into said solution to obtain a culture medium (pH: 2.6). Then, said culture medium was inoculated with 10 ml of rinsed suspension of the ferrobacillus ferrooxidans (ATCC Deposition No. 13,661) and 10 ml of rinsed suspension of the ferrobacillus sulfooxidans (ATCC Deposition No. 14,119) as used in the foregoing Examples, and applied with a cotton stopper. Then, it was cultured in an aerobic condition with shaking at 30°C for 72 hours, and a cultured suspension of 0.65 in cell concentration (transparency of 470 mµ light ray) was obtained. Thereafter, 3500 ml of water and 10 g of $FeSO_4 . 7H_2O$ were added to 500 ml of the thus obtained cultured suspension to prepare the treating solution of the invention. An alloy plate (300 × 100 × 1 mm) consisting of 18 % by weight of chromium, 8 % by weight of nickel, 1 % by weight of sulfur and 73 % by weight of iron which was exposed to the outdoors for 30 days to gather rust, was immersed into the above treating solution at 30°C, and sterile air was fed through the cotton stopper for 4 hours. Thereafter, the plate was taken out from the treating solution and rinsed with water to obtain a clean alloy plate.

EXAMPLE 5

The cultured suspension as used in Example 1 was heated at 50°C and 70°C, and the numbers of remaining live cells were counted. The results of these tests are shown in the following Table 3.

Table 3

| Temp. of Heating | Time of Heating | Number of Live Cells |
|---|---|---|
| 50°C | 10 min. | $2.0 \times 10^2$ cells/ml |
| 50°C | 30 min. | 0 |
| 70°C | 10 min. | 0 |
| Before Heating | — | $3.1 \times 10^6$ cells/ml |

In this Example, the numbers of live cells were measured according to the diluted plate culture method. It will be apparent from the above Table 3 that the micro-organisms in the treatment solution of the present invention can be sterilized at 50°C for a relatively short time, therefore the environmental pollution by the micro-organisms will never be caused. On the other hand, in the conventional surface treatment process, a large amount of the waste solutions for the treatment and rinsing must be rendered free of noxious material before they are discharged. Therefore, a large investment for the treatment apparatus of the waste solution has been required.

Accordingly, the method of the present invention is very advantageous in several view points as compared with the conventional method. It should be emphasized, however, that the specific examples described herein are intended as merely illustrative and in no way restrictive of the invention.

What is claimed is:

1. A method for treating a metallic surface which comprises aerobically contacting the metallic surface with a cultured suspension of ferrobacillus micro-organism, in which said ferrobacillus is at least one member of ferrobacillus ferrooxidans and ferrobacillus sulfooxidans, at a temperature of 20°–45° C.

2. A method for treatment of metallic surface as claimed in claim 1, in which said ferrobacillus is at least one member of ferrobacillus ferrooxidans (ATCC Deposition No. 13,661) and ferrobacillus sulfooxidans (ATCC Deposition No. 14,119).

3. A method for treatment of metallic surface as claimed in claim 1, in which said temperature is 25° to 35°C.

4. A method for treatment of metallic surface as claimed in claim 1, in which said metallic surface to be treated is a member of the group of iron, aluminum, zinc, tin, manganese, nickel, chromium, and alloys of said metals.

5. A method for treating a metallic surface as claimed in claim 1 wherein after said contact, the cultured suspension is heated to a temperature above 45° C.

6. A method of cleaning the surface of a metallic article at least partially coated with objectionable foreign material comprising the steps of:
   a. providing an immersion bath comprising a cultured suspension of a ferrobacillus micro-organism;
   b. immersing the article to be cleaned into said bath maintained at 20°–45°C under aerobic conditions for a time sufficient to effect release of said objectionable material from the surface of said metallic article;
   c. withdrawing said metal article from said bath: and
   d. rinsing said metal article with a fluid to thereby remove the released objectionable material and suspension from the surface thereof to provide a clean surface.

7. A method according to claim 6 wherein said bath is maintained at 25°–35° C. and is aerated.

8. A method according to claim 6 wherein subsequent to step (b), said bath is heated to a temperature above 45° C.

* * * * *